US012316165B2

(12) United States Patent
Witt

(10) Patent No.: US 12,316,165 B2
(45) Date of Patent: May 27, 2025

(54) AXIAL FLUX MACHINE COMPRISING MECHANICALLY FIXED STATOR CORES HAVING RADIALLY EXTENDING SHEET METAL SEGMENTS

(71) Applicant: Schaeffler Technologies AG & Co. KG, Herzogenaurach (DE)

(72) Inventor: Holger Witt, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 368 days.

(21) Appl. No.: 17/782,183

(22) PCT Filed: Nov. 3, 2020

(86) PCT No.: PCT/DE2020/100935
§ 371 (c)(1),
(2) Date: Jun. 3, 2022

(87) PCT Pub. No.: WO2021/110197
PCT Pub. Date: Jun. 10, 2021

(65) Prior Publication Data
US 2023/0006485 A1 Jan. 5, 2023

(30) Foreign Application Priority Data

Dec. 4, 2019 (DE) .................... 10 2019 133 038.6
Jan. 20, 2020 (DE) .................... 10 2020 101 149.0

(51) Int. Cl.
*H02K 1/18* (2006.01)
*H02K 21/24* (2006.01)
(52) U.S. Cl.
CPC ............. *H02K 1/182* (2013.01); *H02K 21/24* (2013.01)

(58) Field of Classification Search
CPC .... H02K 1/2796; H02K 1/2798; H02K 3/708; H02K 3/7125; H02K 4/9046;
(Continued)

(56) References Cited

U.S. PATENT DOCUMENTS 5,801,473 A * 9/1998 Helwig ................ H02K 1/12
310/216.061
9,742,227 B2 * 8/2017 Klassen ................ H02K 1/20
310/254.1
(Continued)

FOREIGN PATENT DOCUMENTS

CN 108141123 A * 6/2018 ............. H02K 1/182
DE 102016219828 * 4/2017 ............... H02K 1/24
(Continued)

OTHER PUBLICATIONS worldwide.espacenet.com translation of CN108141123A (Year: 2018).*
(Continued)

*Primary Examiner* — Eric Johnson
(74) *Attorney, Agent, or Firm* — Suiter Swantz IP

(57) ABSTRACT

An axial flux machine has an annular stator and two rotor elements mounted rotatably relative to the stator about an axis of rotation. A first rotor element is arranged axially adjacent to a first end face of the stator and a second rotor element is arranged axially adjacent to a second end face of the stator. The stator has a plurality of stator cores distributed in a circumferential direction of a circular line extending about the axis of rotation, wherein at least one stator core has a plurality of radially extending guide segments that are stacked on top of one another in the circumferential direction and are of plate-like design. At least a partial quantity of the guide segments have, on the radial outer side thereof and/or the radial inner side thereof, a retaining contour (Continued)

accommodated in an interlocking manner on at least one supporting region fixed to the housing.

14 Claims, 7 Drawing Sheets

(58) Field of Classification Search
CPC .... H02K 3/9108; H02K 1/182; H02K 1/2793; H02K 21/026; H02K 37/06; H02K 37/125; H02K 49/046; H02K 16/02; H02K 21/24
USPC .......................... 310/156.37, 156.32, 156.36
See application file for complete search history.

(56) References Cited

U.S. PATENT DOCUMENTS

| | | | |
|---|---|---|---|
| 10,663,041 B2 * | 5/2020 | Veilleux et al. | H02K 1/2798 310/12.14 |
| 2007/0228860 A1 * | 10/2007 | Rao | H02K 21/12 310/268 |
| 2008/0278019 A1 * | 11/2008 | Lu | H02K 1/27 310/156.32 |
| 2011/0221298 A1 * | 9/2011 | Calley | H02K 1/30 310/216.113 |
| 2012/0091852 A1 * | 4/2012 | Krauth et al. | H02K 15/026 310/216.041 |
| 2015/0318772 A1 * | 11/2015 | Jahshan | B60L 50/40 318/400.41 |
| 2017/0187252 A1 * | 6/2017 | Takahashi et al. | H02K 3/524 310/43 |
| 2021/0152040 A1 * | 5/2021 | Yao | H02K 1/14 |
| 2023/0163669 A1 * | 5/2023 | Miyama | H02K 7/088 310/114 |

FOREIGN PATENT DOCUMENTS

| | | | | |
|---|---|---|---|---|
| EP | 0729663 | B1 | 12/2001 | |
| EP | 1538727 | A2 | 6/2005 | |
| EP | 2606561 | B1 | 10/2014 | |
| JP | 2000253635 | A * | 9/2000 | |
| JP | 2018029423 | A | 2/2018 | |
| WO | 2013084614 | A1 | 6/2013 | |
| WO | 2014166811 | A2 | 10/2014 | |
| WO | WO2016034570 | A1 * | 3/2016 | H02K 1/14 |
| WO | 2018015293 | A1 | 1/2018 | |
| WO | WO-2021240871 | A1 * | 12/2021 | B64C 21/01 |

OTHER PUBLICATIONS worldwide.espacenet.com translation of DE102016219828 (Year: 2017).*

Igarashi, Machine Translation of JP2000253635, Sep. 2000 (Year: 2000).*

* cited by examiner

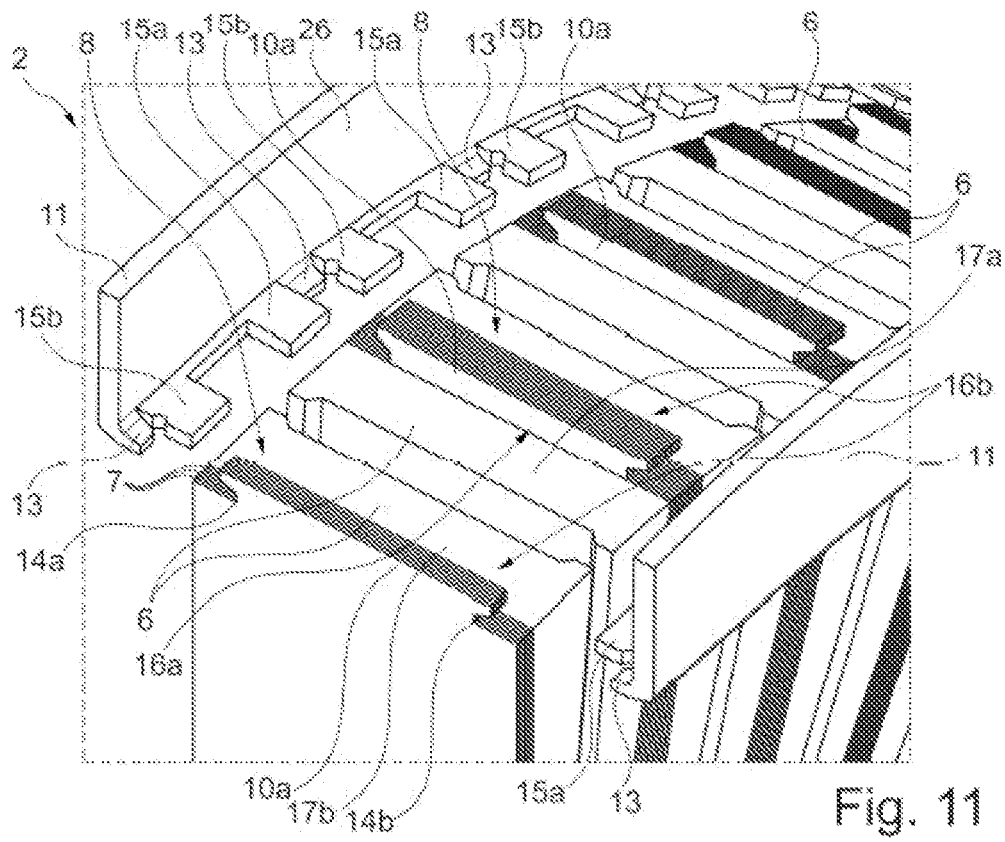
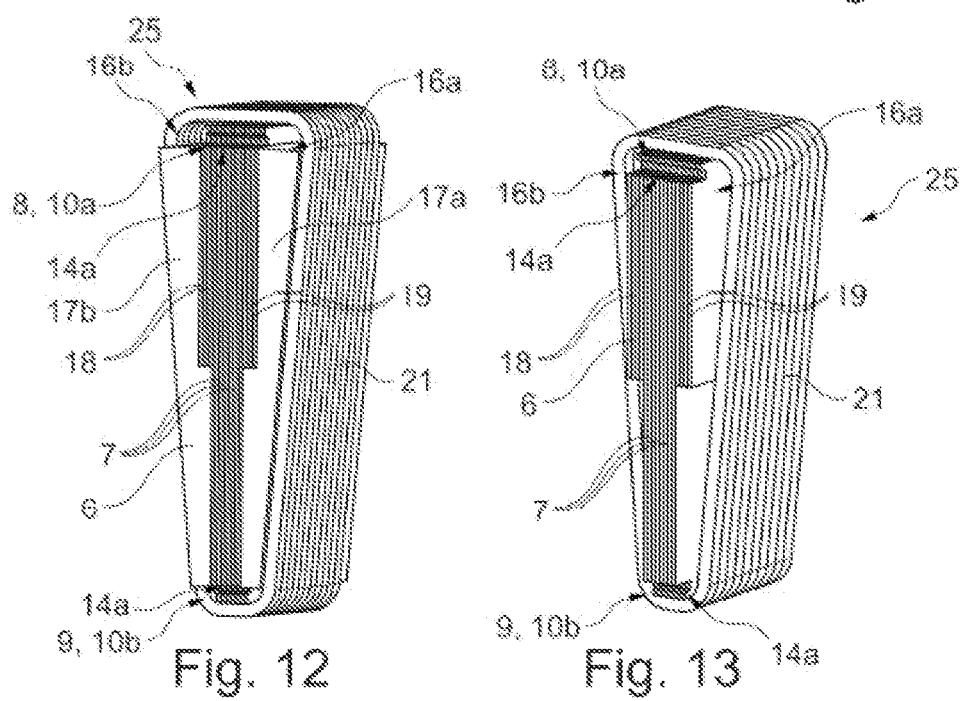

AXIAL FLUX MACHINE COMPRISING MECHANICALLY FIXED STATOR CORES HAVING RADIALLY EXTENDING SHEET METAL SEGMENTS

CROSS-REFERENCE TO RELATED APPLICATIONS

This application is the U.S. National Phase of PCT Appln. No. PCT/DE2020/100935 filed Nov. 3, 2020, which claims priority to DE 102019133038.6 filed Dec. 4, 2019 and DE 102020101149.0 filed Jan. 20, 2020, the entire disclosures of which are incorporated by reference herein.

TECHNICAL FIELD

The disclosure relates to an axial flux machine, preferably for a drive train of a purely electric or hybrid motor vehicle, said axial flux machine comprising an annular stator and two rotor elements mounted rotatably relative to the stator about a (common) axis of rotation, wherein a first rotor element is arranged axially (along the axis of rotation) adjacent to a first (axial) end face of the stator and a second rotor element is arranged axially adjacent to a second (axial) end face of the stator, and wherein the stator has a plurality of stator cores distributed in a circumferential direction of a circular line extending about the axis of rotation.

BACKGROUND

Generic axial flux machines are already well known from the background of the art. For example, WO 2018/015293 A1 discloses a stator for an axial flux machine having a stator portion formed of a plurality of sheets and provided with teeth.

Further background of the art is known, for example, from WO 2014/166811 A2, which discloses a lightweight axial flux machine in which a plurality of stator teeth are connected to one another in end regions via a respective ring structure and to a housing surrounding the stator radially on the outside. Consequently, it is already known to construct stator cores by means of sheets which are arranged laterally to the stator cores in the axial direction.

However, a disadvantage of these designs known from the background of the art has been that the mechanical fixation of the stator cores is often inadequate. Furthermore, the existing magnetic resistance in the required directions is often still relatively large. Also, eddy currents can form in the magnetic core due to the alternating currents in the windings as well as the magnetic fields from the rotor. At the same time, there is a requirement for these systems to efficiently cool the stator windings and stator cores.

SUMMARY

It is therefore the object of the present disclosure to remedy the disadvantages known from the background of the art and, in particular, to provide an axial flux machine with a stator core that is as stable as possible, wherein at the same time the magnetic resistance is reduced in the required directions and undesirable eddy currents are avoided. At the same time, efficient cooling of the components of the stator is to be implemented.

According to the disclosure, this is achieved in that at least one stator core has a plurality of (magnetically conductive) guide segments which are stacked (or, layered) on top of one another in the circumferential direction, extend radially and are of plate-like (or, flat) design, wherein at least a partial quantity of the guide segments has a retaining contour on its radial outer side and/or its radial inner side which is received in an interlocking manner on at least one supporting region which is fixed to the housing (or fixed at the installation location).

This results in several advantages. On the one hand, the radially extending guide segments (preferably designed as sheet metal segments) ensure high mechanical strength against forces in the circumferential direction. This extension of the guide segments simultaneously enables good heat transfer within the guide segments to the outside (preferably towards the fixation). In addition, the radial arrangement of the guide segments achieves a high pole pitch (which is particularly advantageous for high torques). The retaining contours on the guide segments simplify the fixation of the stator core.

Further advantageous embodiments are claimed and explained in more detail below.

If the guide segments of the at least one stator core are designed as identical parts, series production is possible in a particularly economical manner.

Preferably, the multiple stator cores are designed the same. In further embodiments, it is also advantageous if the stator cores are designed differently at least with regard to the retaining contours.

It is also advantageous if the guide segments of the at least one stator core are connected on the radial outer side to two axially spaced, first supporting regions and/or on the radial inner side to two axially spaced, second supporting regions in an interlocking manner. This makes the structural design of the stator even more robust.

The at least one supporting region is preferably annular/designed as a retaining ring.

It is particularly expedient if the guide segments of the at least one stator core are secured in the circumferential direction (of the axis of rotation), radial direction (of the axis of rotation), axial direction (of the axis of rotation) and/or against tilting about an axis parallel to the axis of rotation via an interlock relative to the at least one supporting region.

To implement the interlocking connection between the guide segments and the at least one supporting region, it has proven to be expedient to provide an axially projecting retaining tab on the at least one supporting region, which projects into an undercut which co-forms the retaining contour and is open in the axial direction to the at least one supporting region. The retaining tab is therefore preferably inserted into the retaining contour in such a manner that the guide segments are supported on the supporting region both in the radial and axial directions and against tilting about an axis parallel to the axis of rotation of the rotors. The force acting on the stator cores tangential to the axis of rotation, together with the support, causes a torque on the individual stator core.

For robust circumferential support of the guide segments, it has also proved advantageous if the at least one supporting region has two axially projecting supporting tabs spaced apart in the circumferential direction. between which supporting tabs the guide segments of the respective stator core are accommodated together.

The magnetic resistance is further reduced if the at least one stator core is provided with a covering section consisting of a soft-magnetic composite material towards one circumferential side or towards both circumferential sides of the totality of guide segments.

Further preferably, an electrical insulation is provided between the individual stator cores themselves and/or between the individual stator cores and the at least one supporting region. In the latter case, it is also advantageous if either the insulation is inserted between the guide segments/a package formed by the guide segments and a fixation, or fixation elements are formed directly from electrically non-conductive material.

In this context, it is further expedient if the at least one stator core tapers inward in the radial direction (reduction of the width/extension in the circumferential direction).

Furthermore, it is advantageous if the at least one stator core comprises several groups of guide segments, which groups differ from one another by the formation of their guide segments.

In this context, it has been found to be particularly expedient if the at least one stator core has, in addition to a first group with a plurality of first guide segments which are designed to be identical to one another, a second group with a plurality of second guide segments, wherein the second guide segments have a shorter radial extension than the first guide segments and are arranged stacked towards a first circumferential side of the first group of first guide segments. This further reduces the magnetic resistance.

In this respect, it is also expedient if, in addition to the second group with a plurality of second guide segments, a third group with a plurality of third guide segments is arranged on a second circumferential side, facing away from the first circumferential side, of the totality of first guide segments, wherein the third guide segments have a shorter radial extension than the first guide segments.

If the at least one stator core is divided into two halves in the axial direction, the assembly of the stator cores and the entire stator is further facilitated. In a further preferred embodiment, the stator core is, in turn, formed as a single piece/undivided and, on the other hand, the covering section then present (further preferably the two covering sections present in each case) is divided/halved. This provides the advantage that the windings can be manufactured independently of the stator core and then united.

Furthermore, it is expedient if each stator core is provided with a stator winding, wherein this stator winding forms several axially adjacent winding loops and the respective winding loop narrows inwardly in the radial direction with respect to its circumferential side width.

In other words, according to the disclosure, a mechanical fixation of the stator cores for an axial flux machine is implemented with radially extending electrical sheets (guide segments). The sheets have a contour radially outside and/or radially inside which allows the stator cores to be fixed in an interlocking manner. Optionally, the stator core is covered with an SMC material (SMC="Soft Magnetic Composite") in the circumferential direction.

BRIEF DESCRIPTION OF THE DRAWINGS

The disclosure will now be explained in more detail below with reference to various figures, in which context various exemplary embodiments are also shown.

In the figures:

FIG. 11 shows an exploded view of the partial assembly shown in FIG. 8, FIG. 12 shows a perspective view of an assembly of stator core and stator winding designed according to a second exemplary embodiment, wherein the stator core has different sheet metal segment groups, FIG. 13 shows a perspective view of an assembly of stator core and stator winding designed according to a third exemplary embodiment, wherein two covering sections consisting of SMC material are even dispensed with compared to the second exemplary embodiment according to FIG. 12.

The figures are only schematic in nature and serve only for understanding the disclosure. The same elements are provided with the same reference signs. Furthermore, the features of the different exemplary embodiments can in principle be freely combined with one another.

DETAILED DESCRIPTION

Figure 1:
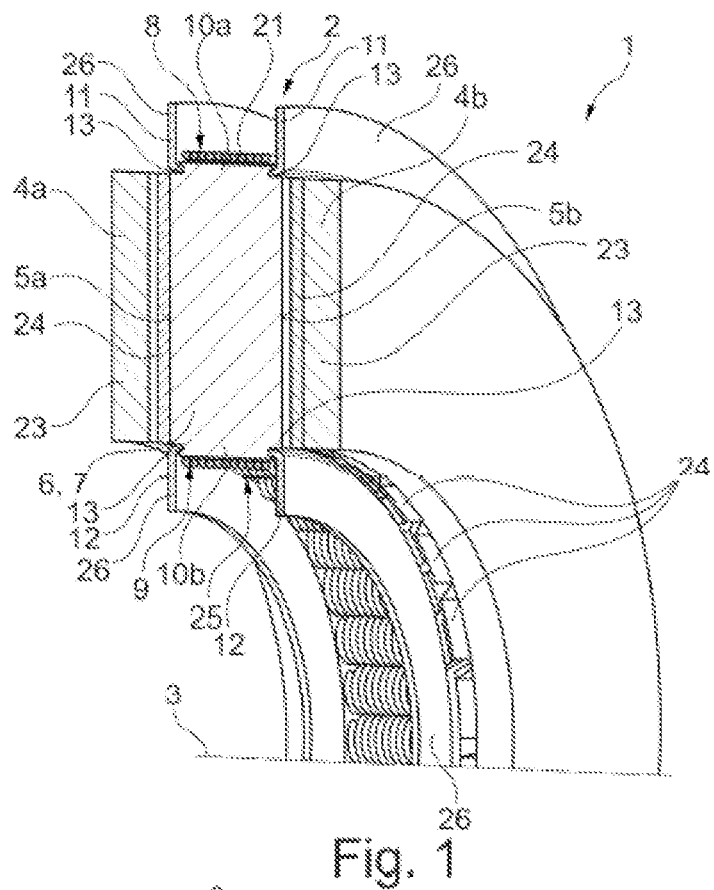
FIG. 1 shows a perspective view of an axial flux machine according to the disclosure, cut in the longitudinal direction according to a first exemplary embodiment, wherein its construction can be clearly seen.

FIG. 1 shows the construction of the axial flux machine 1 according to the disclosure according to a preferred first exemplary embodiment. In its preferred application, the axial flux machine 1 is used in the drive of a motor vehicle. Accordingly, the corresponding motor vehicle is implemented either as a purely electric motor vehicle or a hybrid motor vehicle.

The directional information used below, as can be seen in connection with FIG. 14, refer to a central axis of rotation 3 of both rotor elements 4a, 4b of the axial flux machine 1. Accordingly, an axial direction is a direction along/parallel to the axis of rotation 3, a radial direction is a direction perpendicular to the axis of rotation 3, and a circumferential direction is a direction along a circular line of constant diameter extending coaxially around the axis of rotation 3.

According to the construction of an axial flux machine 1, it has a substantially annular stator 2 that rotates completely in the circumferential direction (FIG. 1). Of course, individual stator teeth 6 could also be left out of the composite of the stator 2. It can be seen that the stator 2 has a thickness (axial extension) that is less than its radial extension (radial height/thickness).

In addition to the stator 2, the two rotor elements 4a, 4b are part of the axial flux machine 1, as already mentioned. A first rotor element 4a is arranged towards a first (axial) end face 5a of the stator 2. A second (axial) end face 5b of the stator 2, facing away axially from the first end face 5a, is provided with a second rotor element 4b. The rotor elements 4a, 4b are each implemented in essentially the same manner. Both rotor elements 4a, 4b each have a disk-shaped main body 23 and a plurality of magnets 24 (permanent magnets) distributed in the circumferential direction, which magnets 24 are arranged on an axial side of the rotor elements 4a, 4b facing the stator 2. The rotor elements 4a, 4b can also be constructed differently; e.g., radially extending between magnetic flux guide elements shaped similar to a piece of pie. The rotor elements 4a, 4b are mounted rotatably relative to the stator 2 about the axis of rotation 3 in a typical manner.

Figure 15:
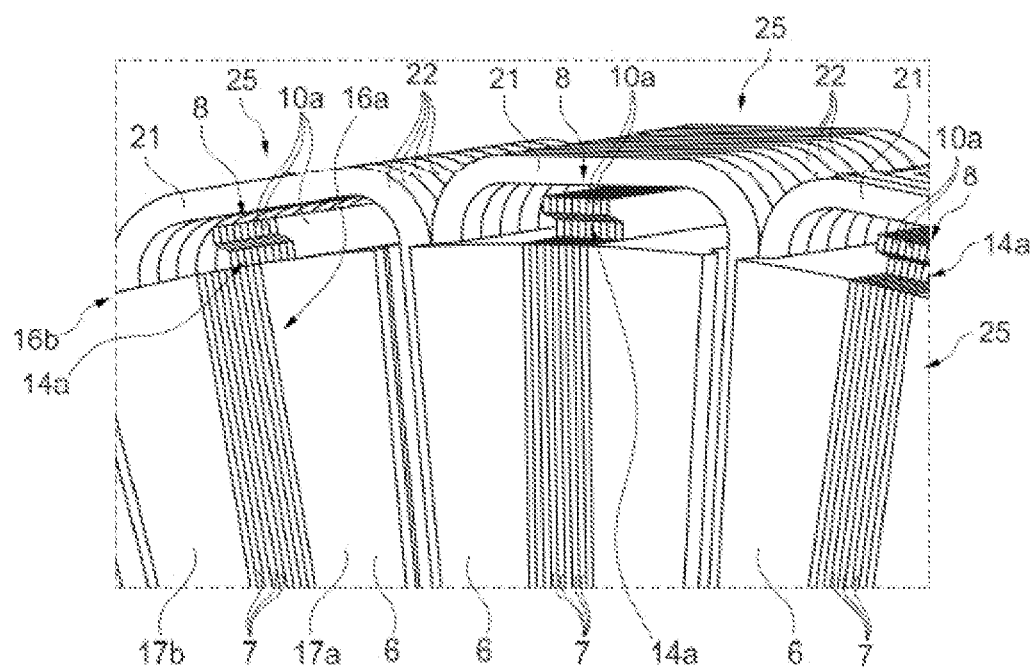
FIG. 15 shows a detailed perspective view of the coil arrangement in the radial outer region of three adjacent stator cores.
Figure 16:
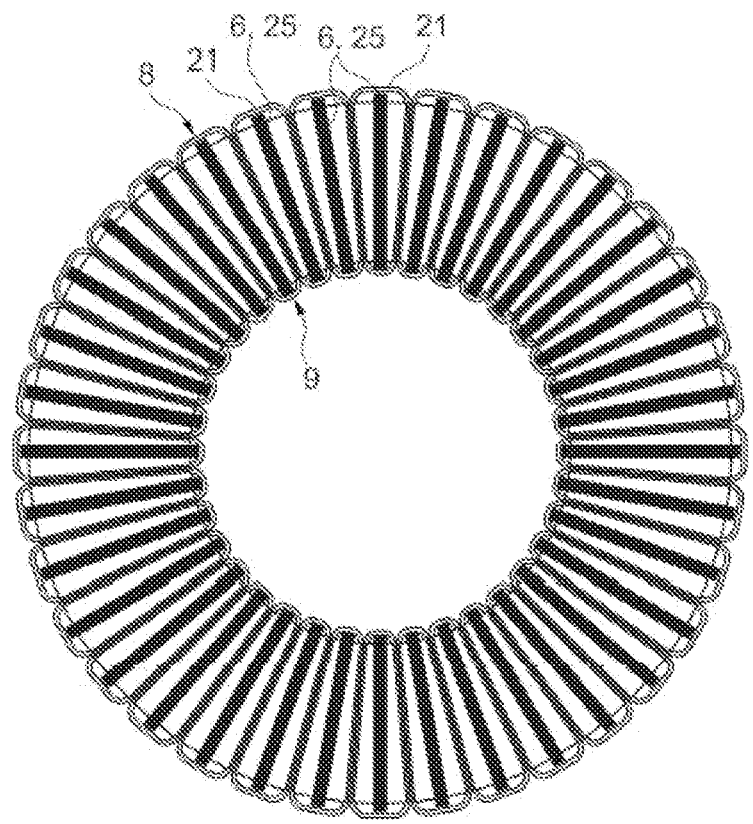
FIG. 16 shows a front view of the entire coil arrangement according to FIG. 14.

In an overall consideration of FIGS. 1 to 5, 8, 9 and 11, the stator 2 is equipped with a plurality of stator cores 6 distributed in a circumferential direction of the axis of rotation 3. The stator cores 6 are each implemented as identical parts to one another. Each stator core 6 serves to accommodate a stator winding 21, which has several winding loops 22 arranged side by side in the axial direction (FIG. 15). Stator core 6 and stator winding 21 typically form a stator coil 25/coil arrangement. As can be seen in FIGS. 14 to 16, the stator coils 25 are arranged uniformly and contiguously distributed in the circumferential direction. The stator coils 25 taper in the radial direction toward their inner side. Each stator coil 25, i.e. each stator core 6 and each stator winding 21 thus has an extension as seen along its radial extension, reducing in the circumferential direction.

Figure 4:
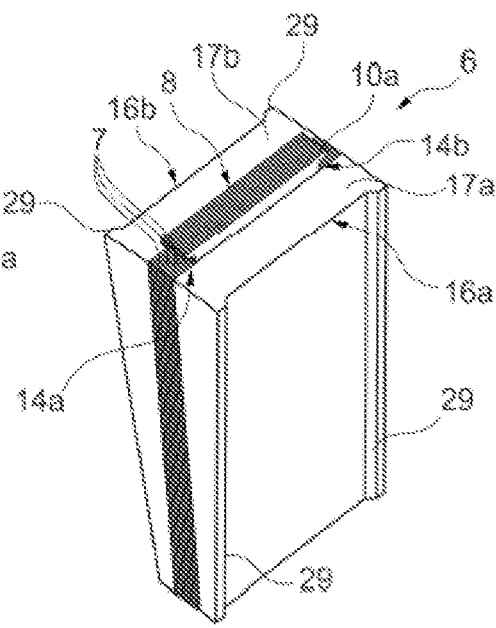
FIG. 4 shows a perspective view of the stator core in full view to its radial outer side.

In an overall consideration of FIGS. 4 to 7, it can also be seen that each stator core 6 has several first guide segments 7 designed as sheet metal segments, which is why these first guide segments 7 are referred to below as first sheet metal segments 7. According to the disclosure, each stator core 6 has several first sheet metal segments 7 aligned/extending in the radial direction of the axis of rotation 3. Each first sheet metal segment 7, in turn, extends along the entire radial length of the stator cores 6 or even directly co-forms the radial ends of the stator core 6. In the FIGS. 6 and 7, a first sheet metal segment 7 is shown as an example. Several first sheet metal segments 7 are stacked on top of one another in the circumferential direction to form a laminated core and are electrically insulated from one another in such a manner that only minimal eddy currents are generated due to the changing magnetic fields, as can be seen in FIG. 4 and in FIG. 5, and are each insulated from one another in a typical manner by means of an intermediate insulation layer which is not shown further here for the sake of clarity.

The first sheet metal segments 7 are provided with a retaining contour 10a, 10b both towards their radial outer side 8 and towards their radial inner side 9, which retaining contours 10a, 10b are each connected in an interlocking manner to a supporting region in the form of a retaining ring 11, 12 of the stator 2.

Figure 7:
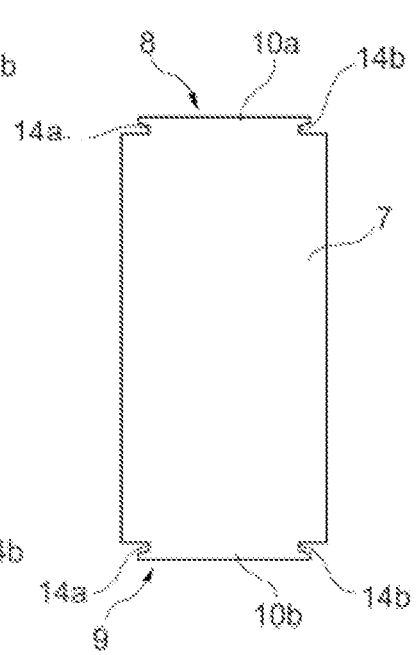
FIG. 7 shows a front view of the first sheet metal segment according to FIG. 6.

The first sheet metal segments 7 are all implemented as identical parts and each have the designated retaining contour 10a, 10b (FIG. 7). Each retaining contour 10a, 10b is formed by a radial extension which forms two undercuts 14a, 14b towards its axial sides. A first retaining contour 10a is formed to a radial outer side 8 of the stator core 6; a second retaining contour 10b is formed to a radial inner side 9 of the stator core 6. The undercuts 14a, 1413, which open axially in opposite directions, are each fixed to a retaining ring 11, 12. In the FIGS. 8, 10 and 11, the interlocking fixation of the first retaining contour 10a on the part of the first two retaining rings 11 is shown. In this context, however, it should be noted that the interlocking fixation of the second retaining contour 10b on the second retaining rings 12 on the radial inner side 9 is implemented in the same way.

Figure 10:
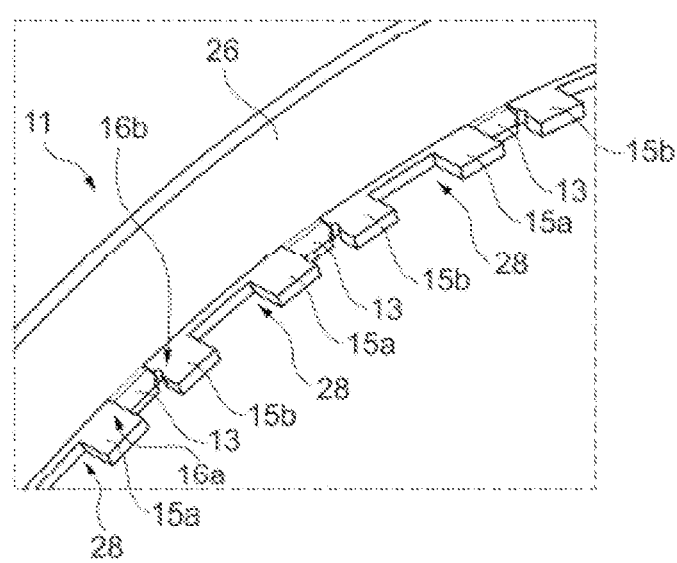
FIG. 10 shows a perspective view of a circumferential area of a retaining ring receiving the stator cores, showing the retaining and supporting tabs forming the interlock.

In FIG. 10, a first retaining ring 11 is shown as an example for the retaining rings 11, 12. This first retaining ring 11 has an annular strip area 26 extending continuously in the circumferential direction. A number of retaining tabs 13 and supporting tabs 15a, 15b project in the axial direction from the strip area 26. A retaining tab 13 is associated with each stator core 6. Two supporting tabs 15a, 15b are also associated with each retaining tab 13. A first supporting tab 15a is arranged immediately adjacent to the retaining tab 13 as viewed in the circumferential direction toward a first circumferential side 16a; a second supporting tab 15b is arranged immediately adjacent to the retaining tab 13 as viewed in the circumferential direction toward a second circumferential side 16b.

In this context, it should be noted for the sake of completeness that the retaining rings 11, 12 in this exemplary embodiment are only of an exemplary nature and, consequently, differently designed supporting regions 11, 12 are also formed in further embodiments, which, however, always effect the fixation of the stator cores. Also, in further embodiments, the first sheet metal segments 7 are also only partially provided with the retaining contour 10a, 10b, which are further attached to the supporting region 11, 12.

Figure 8:
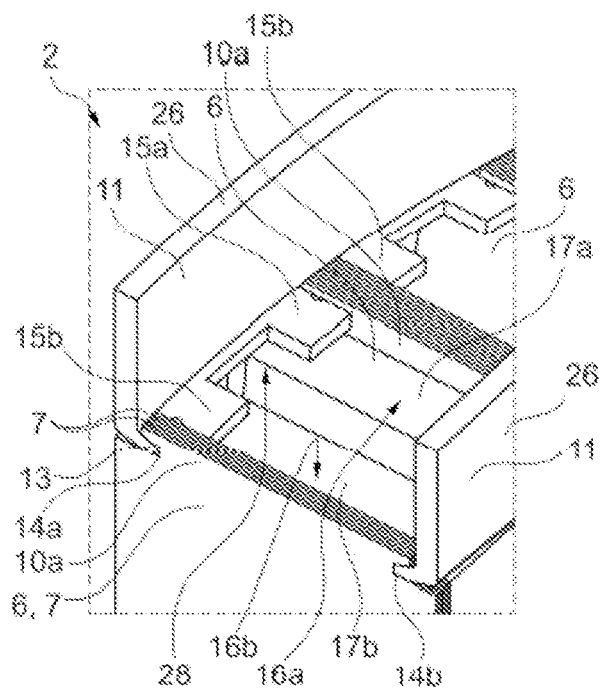
FIG. 8 shows a perspective view of a partial assembly of the stator in a longitudinal section, wherein a plurality of stator cores distributed in the circumferential direction with two axially spaced retaining rings can be seen from a radial outer side without stator windings.
Figure 9:
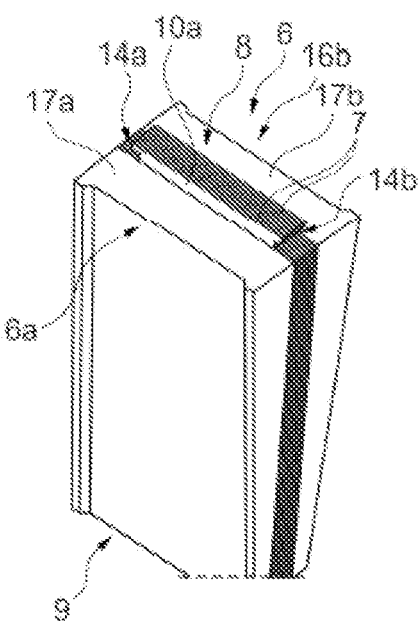
FIG. 9 shows a perspective view of the stator core, similar to FIG. 4, with the orientation implemented in FIG. 8.

In FIG. 8, it can be seen that the retaining tab 13 of the one first retaining ring 11 is inserted into a first undercut 14a so that the stator core 6 is fixed in the radial direction. Furthermore, the retaining tab 13 of the one first retaining ring 11 abuts the first undercut 14a in the axial direction. The retaining, tabs 15a, 15b, which are radially positioned slightly further out relative to the retaining tab 13, abut in the circumferential direction against the group of first sheet metal segments 7. The first supporting tab 15a thereby supports the first sheet metal segments 7 towards the first circumferential side 16a, while the second supporting tab 15b supports the first sheet metal segments 7 towards the second circumferential side 16b. Complementary to this fastening of the stator cores 6 to the one first retaining ring 11, the fastening of the stator cores 6 (on the part of the second undercuts 14b) to the other first retaining ring 11 is implemented. The two first retaining rings 11 are designed as identical parts and are rotated 180° (with respect to a radially extending axis) relative to one another.

Corresponding to the fastening of the stator cores 6 to the first two retaining rings 11, the stator cores 6 are fastened to the second two retaining rings 12. In this context, it should be noted that the retaining tabs 13 of the second retaining rings 12 are not arranged radially inside, but radially outside the supporting tabs 15a, 15b of this second retaining ring 12.

Also, the strip area 26 extends away from the retaining tabs 13 and supporting tabs 15a, 15b radially inward rather than radially outward.

The retaining rings 11, 12 are also formed (by free cuts 28) in such a manner that the corresponding stator winding 21 extends radially in the circumferential direction between the supporting tabs 15a, 15b of different stator cores 6. This becomes clearer in FIG. 8 with the addition of the stator winding 21. The retaining rings 11, 12 are also preferably connected as a whole to the individual first sheet metal segments 7 in such a manner that these first sheet metal segments 7 are loaded on tension.

Referring back to FIG. 2, it can further be seen that an insulation layer 27 (preferably a plastic element or insulating paper) is positioned between the individual first sheet metal segments 7 and the retaining rings 11, 12, so that the retaining rings 11, 12 are insulated from the stator cores 6. Alternatively, the supporting regions/elements 11, 12 can also be partly or entirely made of electrically non-conductive material, so that an electrical insulation is provided between the individual stator cores 6 and the stator cores 6 are also insulated from the motor housing, for example.

In the first exemplary embodiment, the respective stator core 6 has two covering sections 17a, 17b, each adjoining a circumferential side 16a, 16b of the group of first sheet metal segments 7, in addition to the package/the group of first sheet metal segments 7. In this embodiment, each covering section 17a, 17b forms a pole shoe section and is made of a soft-magnetic composite material. A first covering section 17a is applied to the first circumferential side 16a of the group of first sheet metal segments 7, while a second covering section 17b is applied to the second circumferential side 16b of the group of first sheet metal segments 7.

In the FIGS. 12 to 13, two further exemplary embodiments are shown, according to which the stator cores 6 can be designed differently. According to the second exemplary embodiment of FIG. 12, now not only a first group of first guide segments/sheet metal segments 7 is provided in the respective stator core 6. A second group of second guide segments/sheet metal segments 18 and a third group of third guide segments/sheet metal segments 19 are also provided. The second sheet metal segments 18 are arranged towards the first circumferential side 16a directly abutting the first sheet metal segments 7. The third sheet metal segments 19 are arranged towards the second circumferential side 16b directly abutting the first sheet metal segments 7. The second sheet metal segments 18 and third sheet metal segments 19 are identical/designed as identical parts in this embodiment.

However, the second sheet metal segments 18 and the third sheet metal segments 19 are shorter in the radial direction than the first sheet metal segments 7. The second sheet metal segments 18 as well as the third sheet metal segments 19 are essentially implemented as first sheet metal segments 7 halved at a certain radial height. More than two differently stepped sheet metal segments 7, 18, 19 can also be used, e.g., to more accurately reproduce the wedge shape of the stator cores 6. Every second sheet metal segment 18 and every third sheet metal segment 19 therefore now has the first retaining contour 10a towards its radial outer side 8; on its radial inner side, the sheet metal segment 18, 19 is separated and formed without undercuts. The respective second and third sheet metal segments 18, 19 are covered by the covering sections 17a, 17b towards the radial inner side 9.

The sheet metal segments 7, 18, 19 of the various exemplary embodiments are each made of an electrical sheet.

The third exemplary embodiment according to FIG. 13 illustrates that, in principle, the covering sections 17a, 17b can also be dispensed with and the stator winding 21 can be wound directly around the respective first, second and third sheet metal segments 7, 18, 19 accordingly without covering sections 17a, 17b.

In conjunction with FIGS. 17 to 19, alternative assembly steps of the stator 2 according to the disclosure are illustrated in connection with further exemplary embodiments. As shown in FIG. 18, according to a fourth exemplary embodiment, the respective stator core 6 is divided into two halves 20a, 20b in the axial direction. Each half 20a, 20b is associated radially outwardly with a first retaining ring 11 and radially inwardly with a second retaining ring 12 towards the common axial side and is initially connected to these retaining rings 11, 12.

The second half 20b is associated with the other first retaining ring 11 and the other second retaining ring 12, and is thus initially connected to them. Subsequently, the windings 21 are positioned axially between these partial assemblies and the partial assemblies are pushed towards one another in the axial direction, with the halves 20a, 20b being inserted into the respective stator winding 21.

Figure 19:
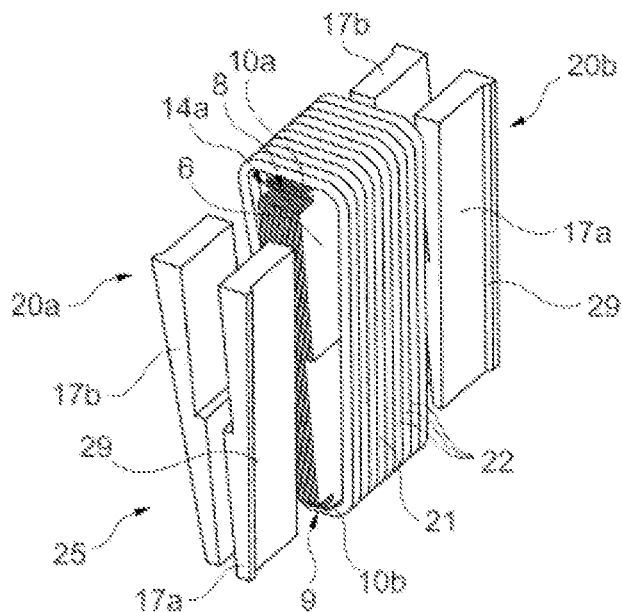
FIG. 19 shows a perspective, partially exploded view of a subassembly consisting of a stator core and stator winding according to a fifth exemplary embodiment, wherein, compared to the fourth exemplary embodiment, only the covering sections are divided into two axial halves.

In this context, it is shown in FIG. 19 that, in principle, only the covering sections 17a, 17b can also be halved and correspondingly inserted into the stator winding 21 in the axial direction from different sides. The sheet metal segments 7, 18, 19 are then preferably each implemented as a single piece. FIG. 19 thus depicts a stator core 6 in which the laminated core is continuous and only the cover sections 17a, 17b are divided. This provides the advantage that the laminated core is continuous for good magnetic conduction. Regarding assembly, it provides the advantage that the coil 21 and stator core 6 can be prefabricated independently of one another and only then are the individual parts joined together. The optional pole shoes 29 on the cover sections 17a, 17b do not interfere with assembly in such a manufacturing sequence.

In other words, according to the disclosure, it is proposed that the sheets 8, 18, 19 extend radially and are optionally covered laterally in the circumferential direction with SMC (covering sections 17a, 17b). Furthermore, the sheets 8, 18, 19 preferably have a contour 10a, 10b radially on the outside and/or radially on the inside, which enables the individual stator core 6 to be fixed in an interlocking manner.

FIG. 4 shows a single stator core 6 without winding. The stator core 6 comprises a central region consisting of iron sheets 7 stacked in the circumferential direction, wherein the individual sheet layers 7 are electrically insulated from one another. The individual sheets 7 each extend approximately in the radial and axial direction (form a corresponding surface which is approximately perpendicular to the circumferential direction).

In the circumferential direction, the stacked sheets 7 can be enclosed by a material with good magnetic conductivity but poor electrical conductivity (e.g., SMC=Soft Magnetic Composite). These material sections 17a, 17b are shown as wedge-shaped parts which rest against the stack of sheets 7 on both sides 16a, 16b in the circumferential direction and form, for example, pole shoes 29 (FIG. 4).

Furthermore, the sheets from the central region 7 have contours 10a, 10b at the outer and/or inner end in the radial direction, which are used for fixing/retaining the cores 6 in an interlocking manner.

Figure 5:
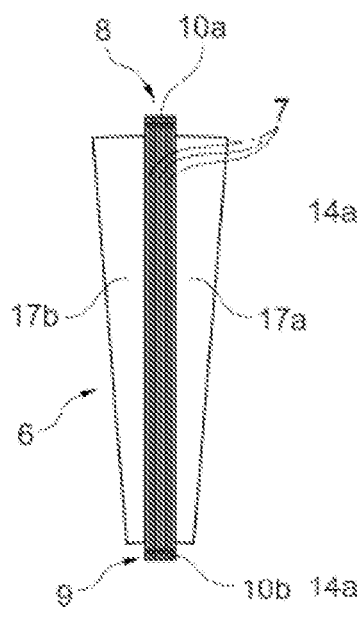
FIG. 5 shows a view of the stator core from its front side.
Figure 6:
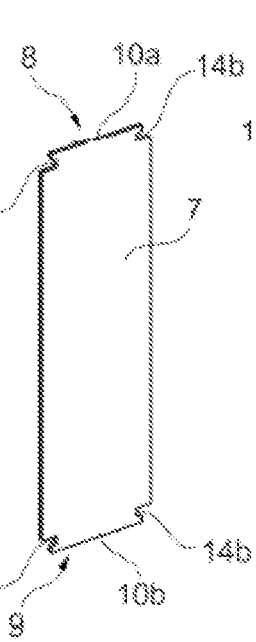
FIG. 6 shows a perspective view of a first sheet metal segment inserted in the stator core.

FIG. 5 shows the same construction, but in a plan view from the axial direction instead of a 3D view. FIG. 6 shows a single sheet 7 in a 3D view. FIG. 7 shows a single sheet 7 in a plan view in the circumferential direction according to use in the iron core 6. The contours 10a, 10b radially inward as well as radially outward for an interlocking fixation can also be seen.

FIG. 10 shows an exemplary design of a retaining ring 11, 12 with contours 13, 15a, 15b for receiving and fixing the individual stator cores 6 via contours 10a, 10b in the radially extending sheets 7 in the individual stator cores 6. In the embodiment shown here, the contours 13, 15a, 15b of the retaining ring 11, 12 project into the cavity inside the winding 21. In order not to obstruct the winding course, the retaining ring 11, 12 further has free cuts 28 for the windings 21.

FIG. 9 again shows a stator core 6 oriented approximately to the retaining ring 11, so that a meshing of the contours 11, 15a, 15b from the retaining ring 11 and the contours 10a, 10b of the sheets 7 from the stator core 6 is possible.

FIG. 8 shows a left and a right retaining ring 11 whose contours are in engagement with the contours of the stator cores 6. The stator cores 6 are arranged between the retaining rings 11. Optionally, but not specifically shown, there is an electrical insulation between the contours on the retaining ring 11 and the contours on the stator core 6, for example in the form of a plastic element or insulating paper. FIG. 11 shows the same arrangement as in FIG. 8, but in an exploded view.

Figure 3:
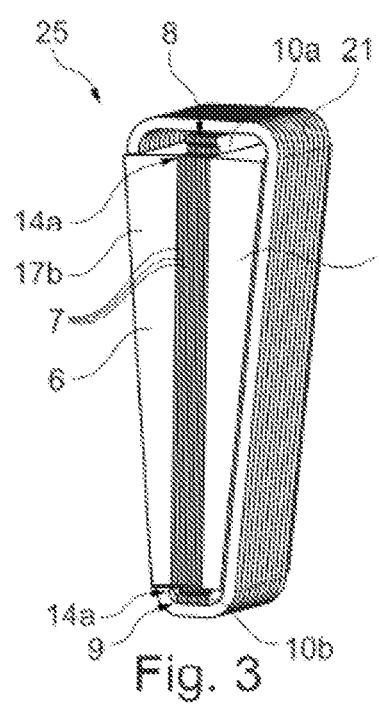
FIG. 3 shows a perspective view of an assembly of the stator core with a stator winding surrounding it.

FIGS. 3 and 12 each show an example of a single stator tooth 6, 25 with a single-tooth winding 21. The two designs of the stator teeth 25 differ in terms of the stack height in the circumferential direction of the laminated cores and different radial heights. FIG. 13 shows a stator core 6 with a winding 21, but without SMC side parts 17a, 17b.

Figure 14:
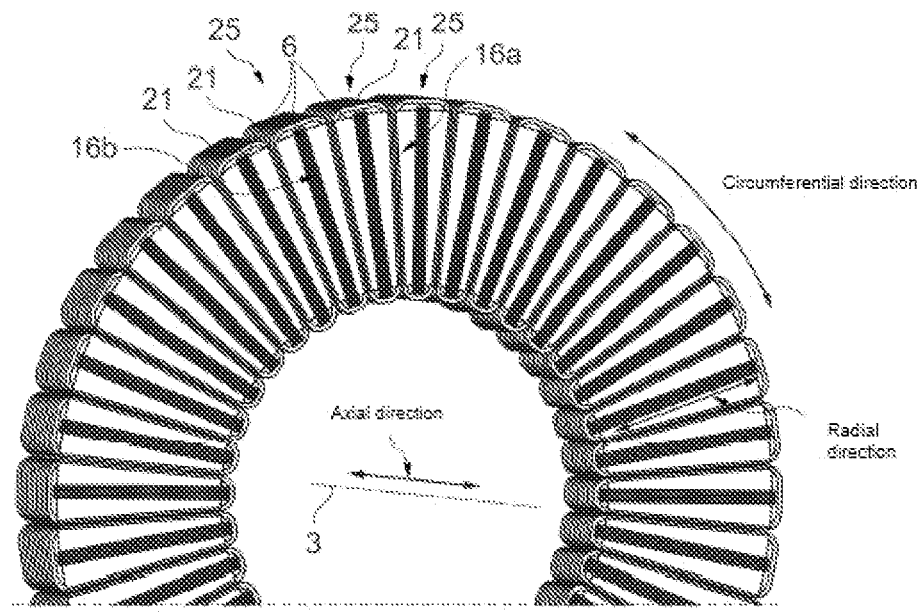
FIG. 14 shows a perspective view of a coil arrangement of the stator, wherein a plurality of stator cores wound with coil windings are arranged in a row in the circumferential direction.

FIG. 14 shows several individual stator cores 6 with single-tooth windings 21, which are arranged annularly to form a stator ring, but are not yet fixed by further mechanical components (e.g., retaining rings). FIG. 15 shows a detailed view of FIG. 14. The contours 10a on the sheets 7 for fixation, which are located inside the windings 21 in the embodiment shown here, can be seen.

FIG. 16 shows the same design as in FIG. 14, but as a plan view in the axial direction. The fixing contours 10a on the sheets 7 of the individual stator teeth 6 can be seen. These contours are shown both radially on the outside and radially on the inside, wherein they can also be provided only on the inside or only on the outside or in another combination, as long as mechanical fixation is ensured.

FIG. 1 shows a stator 2 for an axial flux machine 1 together with rotor disks 4a, 4b. The stator 2 consists of several individual stator teeth 6, which are fixed by means of retaining rings 11, 12. A total of four retaining rings 11, 12 are shown (two inside and two outside). Preferably, the retaining rings 11, 12 are designed internally and externally such that the individual sheets 7 of the individual stator teeth 6 are loaded on tension.

It can be seen from FIG. 1 that the fixation can be arranged by means of retaining rings 11, 12 and meshing contours in such a manner that they hardly increase the axial length of the E-machine 1. This is achieved here by the meshing contours being located within the windings 21 and the radial walls 26 of the retaining rings 11, 12 being arranged axially within the space of the pole shoes 29.

Figure 2:
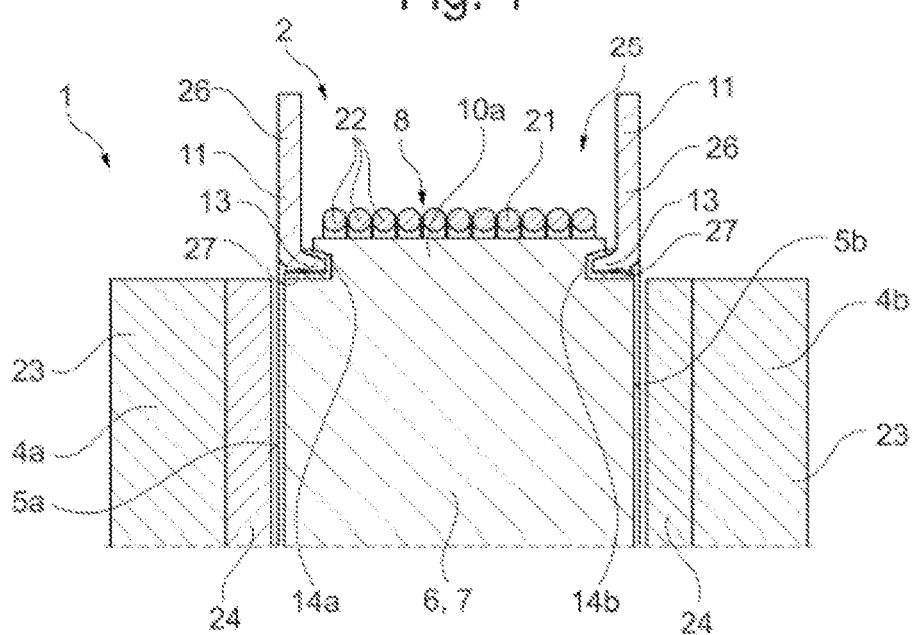
FIG. 2 shows a detail view of the axial flux machine according to FIG. 1 in a longitudinal section, in a radial outer area of a stator core co-forming a stator to illustrate its interlocking reception on two retaining rings.

FIG. 2 shows a section through the stator 2 with rotor 4a, 4b, with an exemplary insulation 27 between the retaining rings 11 and the sheets 7 of the stator core 6.

Figure 17:
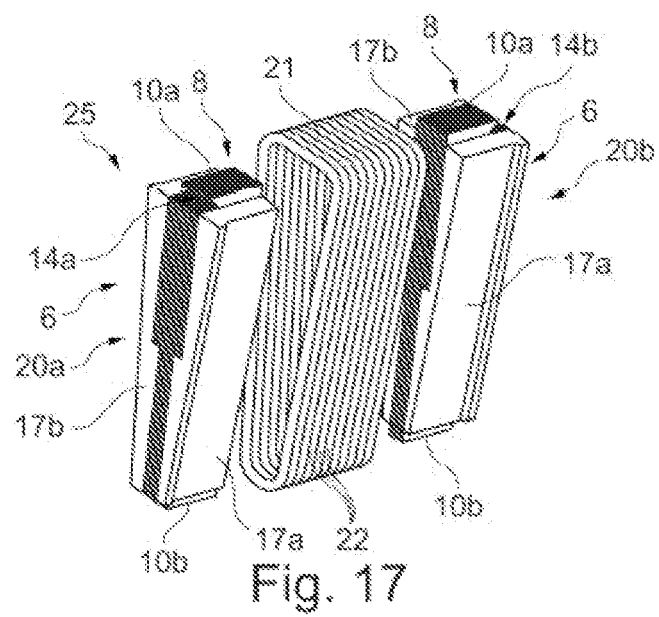
FIG. 17 shows a perspective exploded view of a subassembly consisting of a stator core and stator winding according to a fourth exemplary embodiment, wherein the stator core is divided into two axial halves.
Figure 18:
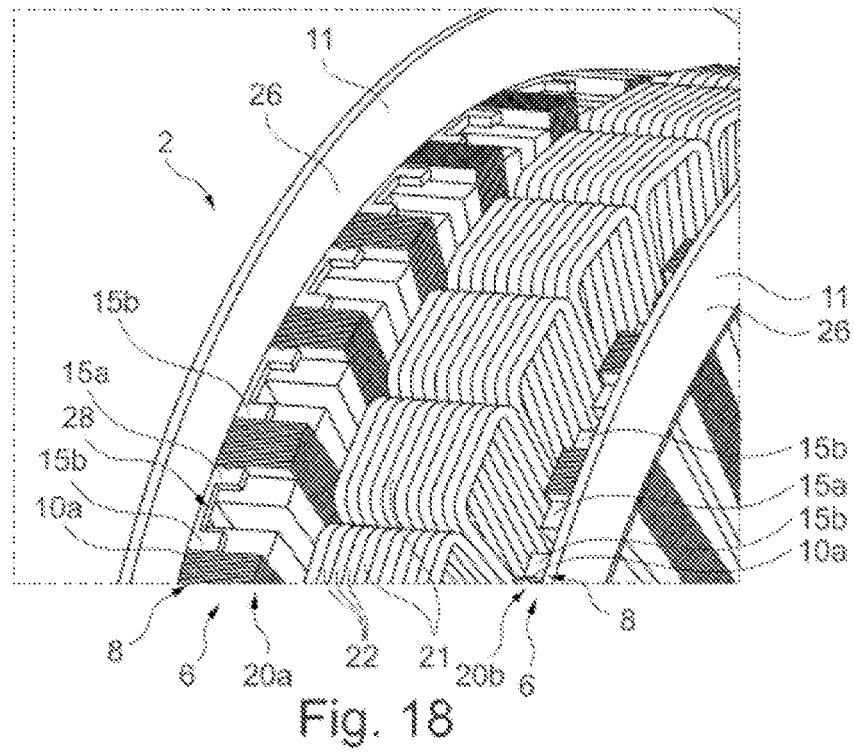
FIG. 18 shows a perspective, partially exploded view of a stator having a plurality of subassemblies according to FIG. 17, wherein each half of a stator core is fixed to one of two outer retaining rings.

FIGS. 17 to 19 show alternative designs for different assembly sequences: In FIG. 17, divided stator teeth 6 are joined after winding the coil (e.g., on a winding support not shown). In FIG. 18, divided stator teeth 6 are preassembled to form stator halves with retaining rings 11,12. Furthermore, the windings 21 are positioned in a circular ring and/or mounted or mechanically fixed. The stator halves and the arranged windings 21 are then joined together. In FIG. 19, the SMC side parts 17a, 17b are joined subsequently. This provides the advantage that the following properties can be combined: —Undivided sheets 7, 18, 19 in the center (good for magnetic flux and for mechanical stability); —Prefabricated windings 21, where the core is joined only subsequently; —SMC side parts 17a, 17b with pole shoe contours 29.

As an alternative to FIG. 19, undivided SMC side parts 17a, 17b can also be used by applying the following joining sequence: —Joining the SMC side parts 17a, 17b into the winding 21 before the laminated core is joined; —Placing the SMC side parts 17a, 17b in circumferential direction against the windings 21; —Joining the laminated core between the SMC side parts 17a, 17b.

In all the above figures, the windings are shown in an exemplary manner. For example, no connections and also no winding supports or insulations are shown, which of course could be additionally required for the manufacturing processes and/or the function of the motor 1.

LIST OF REFERENCE SIGNS

1 Axial flux machine
2 Stator
3 Axis of rotation
4a First rotor element
4b Second rotor element
5a First end face
5b Second end face
6 Stator core
7 First guide segment/first sheet metal segment
8 Outer side
9 Inner side
10a First retaining contour
10b Second retaining contour
11 First retaining ring
12 Second retaining ring
13 Retaining tab
14a First undercut
14b Second undercut
15a First supporting tab
15b Second supporting tab
16a First circumferential side
16b Second circumferential side
17a First covering section
17b Second covering section
18 Second guide segment/second sheet metal segment
19 Third guide segment/third sheet metal segment
20a First half
20b Second half
21 Stator winding
22 Winding loop
23 Main body
24 Magnet
25 Stator coil
26 Strip area
27 Insulation layer
28 Free cut
29 Pole shoe

The invention claimed is:
1. An axial flux machine comprising:
an annular stator; and two rotor elements mounted rotatably relative to the stator about an axis of rotation, wherein a first rotor element of the two rotor elements is arranged axially adjacent to a first end face of the stator and a second rotor element of the two rotor elements is arranged axially adjacent to a second end face of the stator, and wherein the stator has a plurality of stator cores distributed in a circumferential direction of a circular line extending about the axis of rotation, wherein at least one stator core has a plurality of radially extending guide segments that are stacked on top of one another in the circumferential direction and are of plate-like design, wherein at least a partial quantity of the guide segments have a first retaining contour on a radial outer side thereof and a second retaining contour on a radial inner side thereof, wherein at least the first retaining contour or the second retaining contour is accommodated in an interlocking manner on at least one supporting region fixed to a housing, wherein at least the first retaining contour or the second retaining contour is formed by a radial extension which is shaped like a hook and forms an undercut, wherein the at least one supporting region has an axially projecting retaining tab which projects into the undercut and the radial extension abuts an outer surface of the retaining tab for interlocking therebetween, wherein the stator comprises a plurality of stator windings, wherein each of the plurality of stator cores is associated with a respective stator winding of the plurality of stator windings, wherein at least one stator winding is wound around the first retaining contour and the second retaining contour, wherein the axially projecting retaining tab is disposed radially within the at least one stator winding.

2. The axial flux machine according to claim 1, wherein the guide segments of the at least one stator core are designed as identical parts.

3. The axial flux machine according to claim 1, wherein the guide segments of the at least one stator core are connected on the radial outer side to two axially spaced, first supporting regions and/or on the radial inner side to two axially spaced, second supporting regions in an interlocking manner.

4. The axial flux machine according to claim 1, wherein undercut is open in the axial direction to the at least one supporting region.

5. The axial flux machine according to claim 4, wherein the guide segments of the at least one stator core are secured in the circumferential direction, radial direction, axial direction and/or against tilting about an axis parallel to the axis of rotation via an interlock relative to the at least one supporting region.

6. The axial flux machine according to claim 4, wherein an electrical insulation is provided between individual stator cores and/or between the individual stator cores and the at least one supporting region.

7. The axial flux machine according to claim 1, wherein the at least one stator core is provided with a covering section made of a soft-magnetic composite material towards one circumferential side or towards both circumferential sides of a totality of the guide segments.

8. The axial flux machine according to claim 1, wherein the at least one stator core has, in addition to a first group with a plurality of first guide segments which are designed to be identical to one another, a second group with a plurality of second guide segments, wherein the second guide segments have a shorter radial extension than the first guide segments and are arranged stacked towards a first circumferential side of the first group of first guide segments.

9. The axial flux machine according to claim 8, wherein, in addition to the second group with a plurality of second guide segments, a third group with a plurality of third guide segments is arranged on a second circumferential side, facing away from the first circumferential side, of a totality of first guide segments, wherein the third guide segments have a shorter radial extension than the first guide segments.

10. The axial flux machine according to claim 1, wherein the at least one stator core is divided into two halves in the axial direction.

11. An axial flux machine, comprising:
an annular stator; and
first and second rotor elements mounted rotatably relative to the stator about an axis of rotation,
wherein the stator has at least one stator core with a plurality of radially extending guide segments that are stacked on top of one another in a circumferential direction, wherein at least a partial quantity of the guide segments have a first retaining contour on a radial outer side thereof and a second retaining contour on a radial inner side thereof, wherein at least the first retaining contour or the second retaining contour is accommodated in an interlocking manner on at least one supporting region fixed to a housing, wherein at least the first retaining contour or the second retaining contour is formed by a radial extension which is shaped like a hook and forms an undercut, wherein the at least one supporting region has an axially projecting retaining tab which projects into the undercut and is open in an axial direction to the at least one supporting region, and wherein the radial extension abuts an outer surface of the retaining tab for interlocking therebetween, wherein the status comprises a plurality of stator windings, wherein each of the plurality of stator cores is associated with a respective status winding of the plurality of stator windings, wherein at least one stator winding is wound around the first retaining contour and the second retaining contour, wherein the axially projecting retaining tab is disposed radially within the at least one stator winding.

12. The axial flux machine according to claim 11, wherein the guide segments are connected on the radial outer side to two axially spaced, first supporting regions and/or on the radial inner side to two axially spaced, second supporting regions in an interlocking manner.

13. The axial flux machine according to claim 11, wherein:
a first group of the guide segments are designed to be identical to one another; and
a second group of the guide segments have a shorter radial extension than the first group of the guide segments and are arranged stacked towards a first circumferential side of the first group of the guide segments.

14. The axial flux machine according to claim 13, wherein a third group of the guide segments is arranged on a second circumferential side, facing away from the first circumferential side, of a totality of the first group of the guide segments, wherein the third group of the guide segments have a shorter radial extension than the first group of the guide segments.

* * * * *